United States Patent [19]

Crepin

[11] 4,372,215

[45] Feb. 8, 1983

[54] PROCESS AND APPARATUS FOR TRANSPORTING AND DROPPING A PLURALITY OF CHARGES CONTAINED IN A SINGLE CONTAINER AND CONTAINER EQUIPPED WITH SUCH AN APPARATUS

[75] Inventor: Roger Crepin, Paris, France

[73] Assignee: Thomson-Brandt, Paris, France

[21] Appl. No.: 151,669

[22] Filed: May 20, 1980

[30] Foreign Application Priority Data

May 13, 1980 [FR] France ................... 79 13201

[51] Int. Cl.³ ............................................. F42B 25/02
[52] U.S. Cl. ................................. 102/387; 102/394
[58] Field of Search ........ 102/394, 387, 505, 337–340; 89/1.5 C, 1.5 R, 1.5 D

[56] References Cited

U.S. PATENT DOCUMENTS

| | | | |
|---|---|---|---|
| 3,299,810 | 1/1967 | Robert | 102/387 |
| 3,625,106 | 12/1971 | Russo et al. | 89/1.5 D |
| 3,713,387 | 1/1973 | Karp | 102/387 |
| 3,857,338 | 12/1974 | Bucklisch | 102/387 |

Primary Examiner—Charles T. Jordan
Attorney, Agent, or Firm—Oblon, Fisher, Spivak, McClelland & Maier

[57] ABSTRACT

The invention concerns a process and apparatus for transporting and dropping a plurality of charges contained in a single container. Within the shell of the container is arranged a plurality of modules, the bodies of which contain a charge, which may particularly be military; said modules are extracted one by one, upon command, through the rear of the shell. This extraction can take place only if a general mechanical control element has moved from a position called the "safety" position to a position called the "cocked" position, a movement which can take place only when the means for fastening the container has been released from the lug holding it to the carrier vehicle. The invention is applied particularly to modular bombs having fragmentable modules designed for neutralization of relatively widespread ground targets.

16 Claims, 7 Drawing Figures

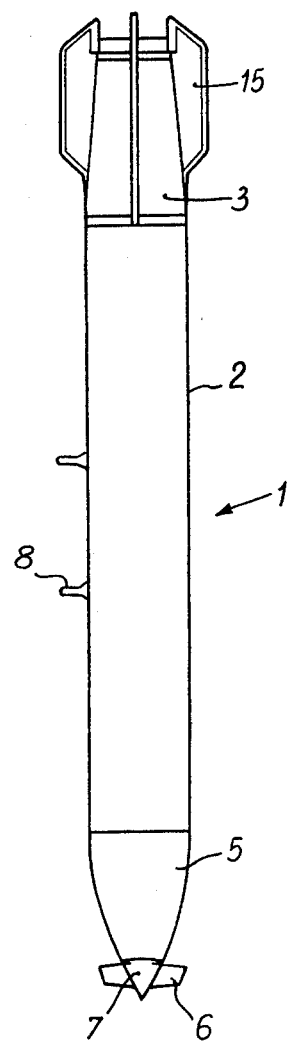

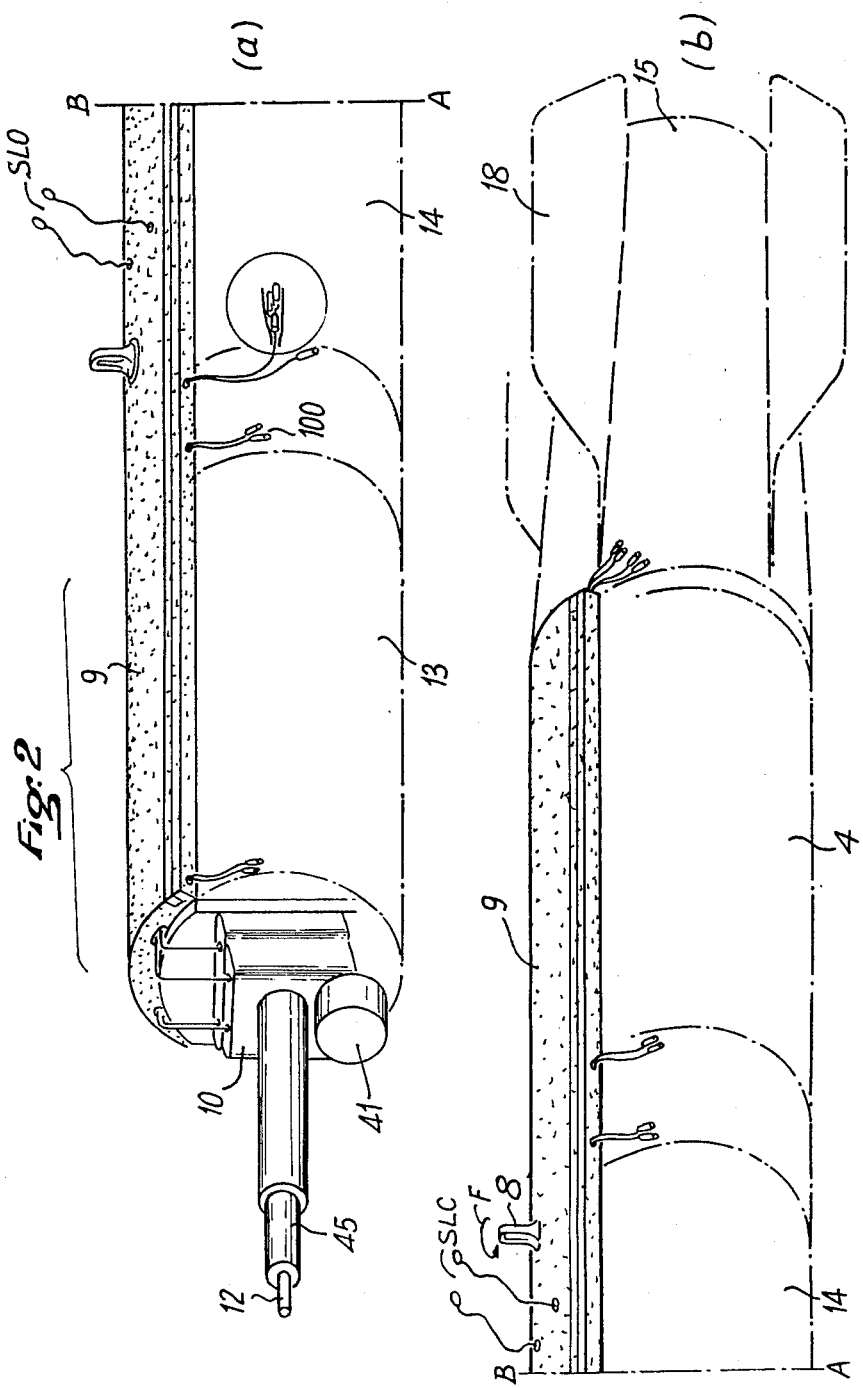

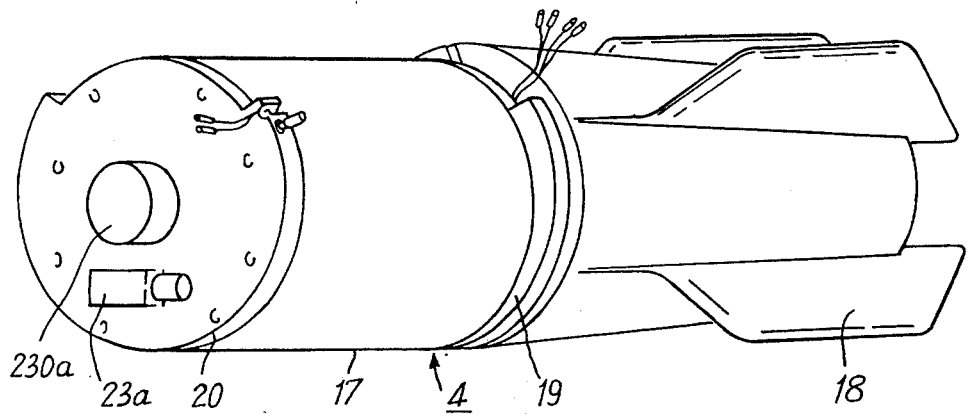
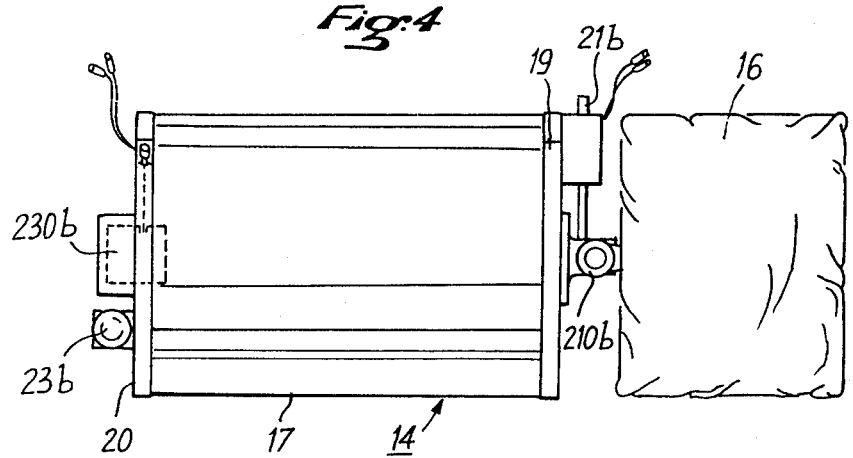
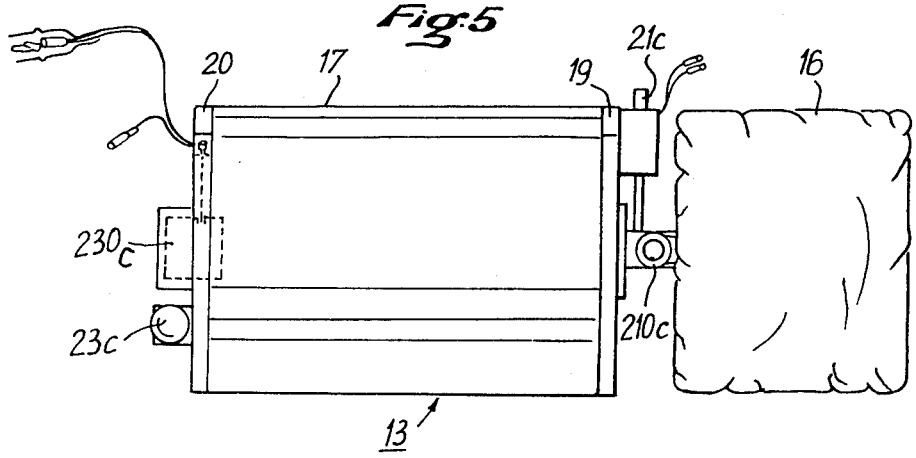

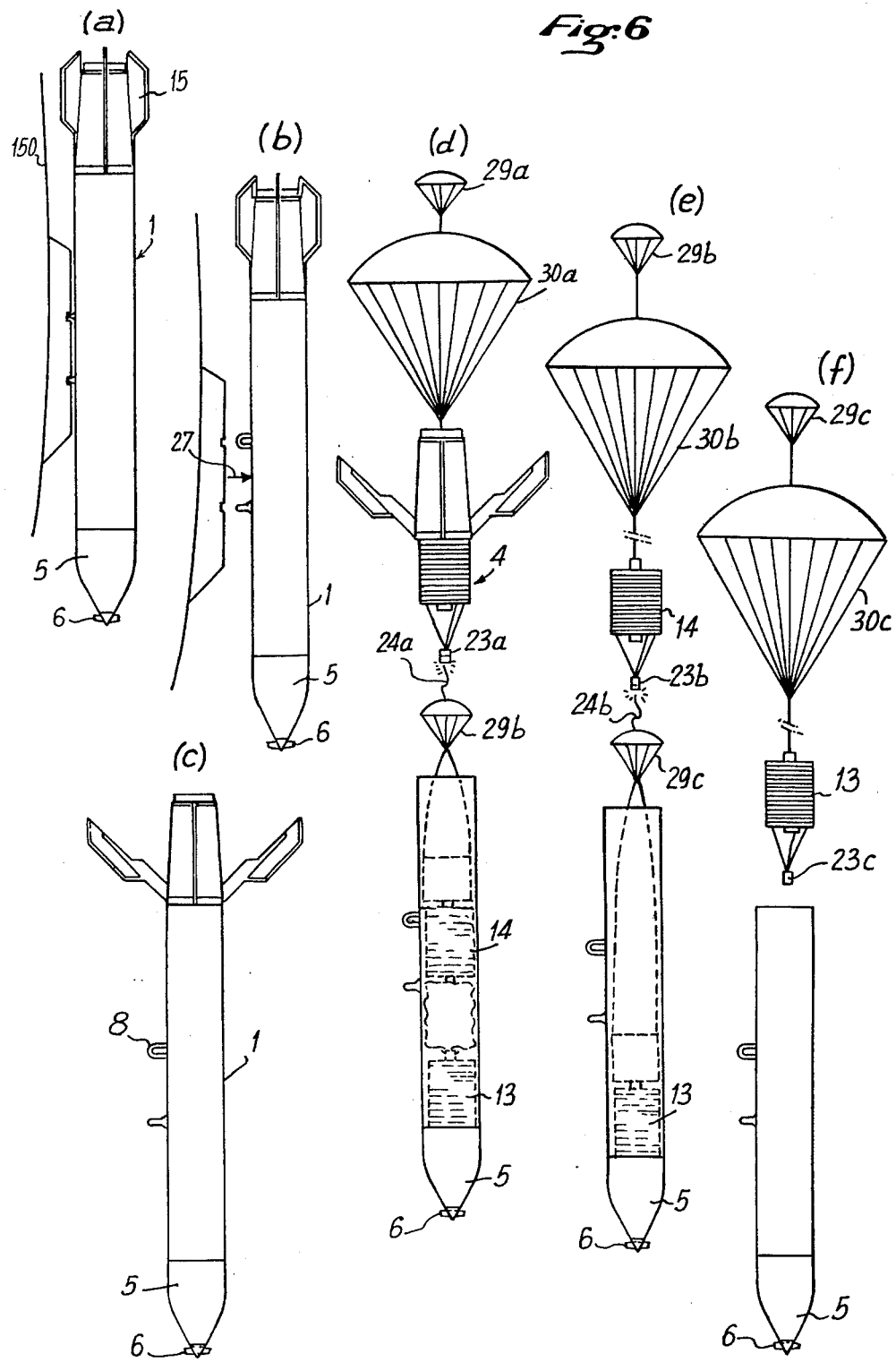

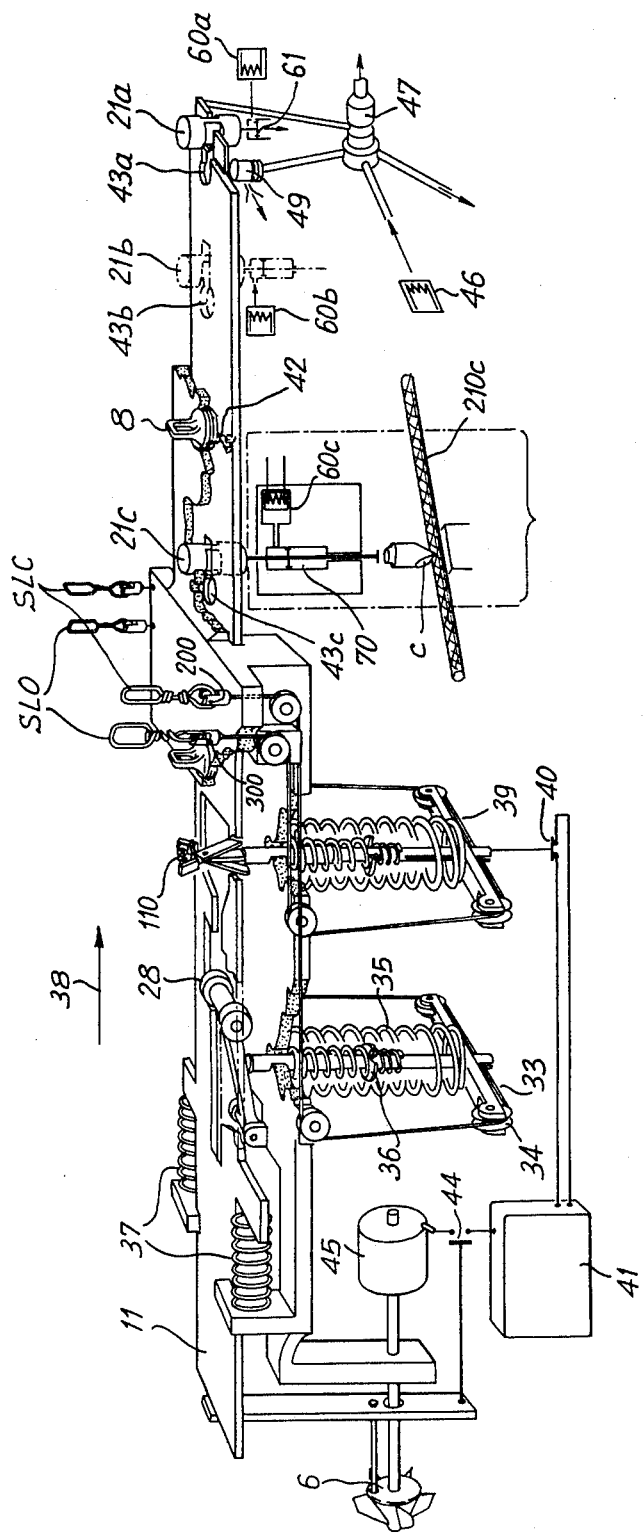

PROCESS AND APPARATUS FOR TRANSPORTING AND DROPPING A PLURALITY OF CHARGES CONTAINED IN A SINGLE CONTAINER AND CONTAINER EQUIPPED WITH SUCH AN APPARATUS

BACKGROUND OF THE INVENTION

1. Field of the Invention

The present invention concerns a device and a process for transporting and dropping a plurality of charges contained in a single container suspended from an aircraft. It further concerns any container equipped with such a device.

2. Description of the Prior Art

Said charges may be of extremely varied nature. In particular, they may involve provisions or medical equipment contained in primary containers which are themselves arranged inside a body designed to be suspended from the carrier vehicle, such as an aircraft. They may also involve explosive military charges designed to neutralize relatively widespread or dispersed ground targets. Such a result is generally obtained by means of two families of weapons, one of which consists of spreading a large number of autonomous sub-projectiles, and the other of sending out a great number of powerful fragments. If a plurality of module units having fragmentable bodies can be arranged inside a so-called modular bomb and endowed with means for ejecting the bomb units one after the other at preset moments, then the combined advantages of the two families of weapons may be obtained.

In all cases, but particularly with regard to military explosive charges, it must be impossible for any action to be carried out (e.g., firing of explosive means) within the module units as long as the body containing them is not actually disconnected from the carrier vehicle, i.e., before release has actually taken place.

SUMMARY OF THE INVENTION

The present invention is proposed in order to resolve these problems. It concerns a device for transporting and dropping a plurality of charges contained in a single container which is suspended from a carrier vehicle of the aircraft type, said container comprising a shell, a nosecone shaped forward point and a back cover, said apparatus being characterized in that it comprises: a plurality of modules assembled longitudinally within the shell from front to back, each containing a charge; and control means and safety release means preventing any action upon the container and modules as long as the means for suspending the container onto the lug of the carrier vehicle have not been separated from each other.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 represents an exterior view of the visible parts, before use, of a container conforming to the invention.

FIG. 2 shows the arrangement of the modules inside the container.

FIGS. 3, 4, and 5 represent schematically, in greater detail, each of the elements shown assembled in FIG. 2.

FIG. 6 is a diagram illustrating the various release sequences of a device under the invention.

FIG. 7 represents schematically an embodiment which ensures the proper progression of the release phases described with reference to the preceding figure.

DETAILED DESCRIPTION OF THE PREFERRED EMBODIMENTS

For greater clarity, identical elements bear the same reference numbers in all of the figures.

The example described relates to a modular bomb, although as stated above it may involve a container having the same outer shape as a bomb, in which are arranged a plurality of modules themselves containing any kind of charge, such as provisions or equipment of various sorts.

As FIG. 1 shows, a bomb 1 in conformity with the invention, seen from the outside before release, essentially comprises a shell 2 designed to contain a plurality of modules arranged longitudinally within the latter, a rear part 3, tail unit mount 15, integral with the rear module in the example described, as explained below, or integral with the shell and a nosecone-shaped forward point 5, and finally a wind engine 6 comprising a paddle-bearing cone 7 designed to turn and so provide energy to an electric generator (not shown) supplying current to the electric and electronic control devices. A fastening system 8 ensures the hanging of bomb 1 on the craft which is to transport it.

As shown in FIGS. 2 through 5, the upper part of bomb 1 comprises over the entire cylindrical length of its shell 2 (not visible in these figures), a metallic beam 9, the section of which takes the shape (for example) of a crescent with truncated points. The bomb in FIG. 2 is represented in two parts cut along section AB (with FIG. 2a representing the front and 2b representing the back). Said beam 9 fulfills several functions, particularly those of enclosing and distributing throughout the assembly the force due to carrying, of carrying means such as 8 for fastening the bomb to its carrier (means at least one of which is capable of turning as shown by arrow F), of holding the modules by means of bolts until their release, and of guiding the latter in rolling motion during their release. Releasable safety wires SLO and SLC and their pulleys, as well as electric power cabling wires for the modules (referred to generally as 100), are housed within said beam 9, which further supports, in front, the mounting for the releasable safety wire retraction means, said support being denominated seat 10 in the following description. Finally, said beam guides a general mechanical control element called a "bus bar," the description and function of which are specified below, more particularly with the help of FIG. 7. Seat 10 is extended forward in electric generator mounting 45 and the bearings of the wind engine, as well as in electronic sequencer 41, with the whole being contained within cone 5 described using FIG. 1. Electronic sequencer 41 delivers the electrical orders necessary for triggering the various phases of the sequence. Sequencer 41 may execute said sequence according to a short option or long option. The choice of option is made, as described below, by means of the nosecone safety release (SLO). The forward end of the cone is truncated and allows axle 12 of the wind engine to pass through.

Beam 9 is equipped with means for fastening and locking a plurality of modules comprising at least a forward module 13 and a rear module 4. In the example described, a third, intermediate module 14 is alone provided, although there may in fact be a greater number. Rear module 4 comprises a tail unit 15 which, prior to release of the bomb, serves as a tail unit for the latter. All of the modules comprise a parachute container 16 (not visible in FIG. 3 with respect to the rear module) and a body proper 17, described below. This contains the charge, which, in the example described, is a military charge. Tail unit 15 comprises deployable fins 18, e.g., of light alloy, the coordinated opening of which is controlled by a pyrotechnical generator (not shown). The tail unit assembly may be oriented angularly with respect to the module, and therefore with respect to the bomb, so as to be adapted to various carrying configurations. The parachute container, such as 16, is fastened upon the back cover 19 of module 4 and is disposed, in this case, between the fins of tail unit 15 (it is not visible in FIG. 3). In the other cases, said parachute and its extractor are disposed between the front cover of one module and the back cover of the next. The body of the modules consists of steel cylinders, which in the application described are prefragmented, involving, for example, a machining of the outer surface of the cylinder so as to create over the entire such surface a network of grooves which reduce locally the thickness of the body and thus constitute breakage commencement zones such that, when the explosive charge contained in the body is fired, the pressure dislocates said body and fragments it into a very great number of fragments of precise size. The body is hermetically sealed by pressure resistant means, a back cover 19 (tail unit mount, in the case of back module 4) and a front cover 20. Fastening bolts, referred to as 21a, 21b, and 21c, for each of the modules (bolt 21a corresponding to the rear module is not visible on FIG. 3) prevent all longitudinal movement of the modules inside shell 2. Their retraction, on the other hand, releases the module, which may then be extracted as explained below. In retracting, said bolts also neutralize the means retaining the folded parachute. This involves, for example, a part of the bolt machined into the shape of a knife which severs a retaining means 210b, 210c (involving a halyard which is cut) holding the parachute in its container. Each front cover 20 carries a fuse 230a, 230b, 230c and the fastening cords of a piezoelectric impact detector 23a, 23b, 23c, onto which is attached in breakable manner (e.g., by a tie having a calibrated breaking point), as will be seen using FIG. 6, a parachute extractor belonging to the following module. In the case of front module 13, which is not followed by another drop, this tie, instead of being connected to a parachute extractor, is connected to seat 10. All of these modules are therefore made integral with beam 9 and locked to it. According to one important characteristic of the invention, the bus bar, as explained below, occupies two positions: a so-called "safety" position and a so-called "cocked" position. In the first position, the bar prevents any unlocking of the lockable elements, particularly the bolts which block the longitudinal movement of the modules and their extraction from the bomb. On the other hand, passage into the second position releases the various blocking and locking systems, thus enabling execution of all functions. Furthermore, because of a special arrangement of means 8 for suspending the bomb to the lug of the transporting vehicle, displacement of the bus bar may take place only if said suspension means are actually released from said lug. In the example described, said suspension means consist of rings, at least one of which pivots (see arrow F of FIG. 2) under the effect of the bus bar, which draws back from its first to its second position. If the ring is not released from the lug, i.e., if the bomb is still connected to the carrier, the bus bar cannot draw back since the ring cannot turn.

The process for using the bomb is described below, by means of FIGS. 6 and 7, which represent schematically the various sequences for release of the bomb and its modules and the means enabling the use of such release.

FIG. 6a represents the situation in which bomb 1 is still suspended from aircraft 150. Its tail unit is in retracted position and bus bar 11 (see FIG. 7) is in "safety" position. In the course of the sequence represented in FIG. 6b, separation has taken place (schematized by arrow 27). Upon such separation, as explained below, means are put in use (safety releases) for retracting a locking device which locks the bus bar. The latter is then freed and moves from "safety" position into "cocked" position. From this moment forward all of the fastening elements become unlockable. In particular, bolts 21a, 21b, 21c for fastening each of the modules may, upon command given by the electronic sequencer, be retracted, releasing the module concerned and simultaneously severing, as stated above, the halyard which prevents opening of the corresponding main parachute. FIG. 6c corresponds to the sequence in which the command for opening tail unit 15 is given, with simultaneous connection of main parachute 30a with back module 4. FIG. 6d corresponds to the sequence in which the command for unlocking rear module 4 and release of parachute extractor 29a has just been given by the sequencer. Bolt 21a is retracted, releasing this module and enabling the opening of parachute extractor 29a, thus inducing the opening of the main, wide sail parachute 30a. Piezoelectric detector 23a, connected by a breakable tie 24a to parachute extractor 29b of the following module 14 (middle module), extracts said extractor 29b before breakable tie 24a (having a calibrated breaking point) breaks. The bomb is then aerodynamically stabilized by parachute extractor 29b, which also provides at the proper time (following shearing of the halyard preventing opening of the main parachute) the force necessary for release of the main parachute. The following sequence, represented in FIG. 6e, corresponds to the command unlocking bolt 21b of intermediate module 14, which likewise leads to the shearing of the halyard which prevents the opening of main parachute 30b of the intermediate module. This module has already pulled away from the bomb and the breakable tie 24b connected piezoelectric detector 23b and parachute extractor 29c of front module 13 (the last in the example described) has been broken. FIG. 6f corresponds to the sequence in which front module 13 in turn has been extracted from the bomb, by virtue of the opening of its main parachute 30c according to the same technique previously described for the previous module.

FIG. 7 is a diagram showing the arrangement of the principal means used to assure rear release, one by one and on command, of the various modules, according to the sequences which have been described with reference to the preceding figure. FIG. 7 shows how these means cooperate mutually for performance of these various sequences. During release, the lugs of the pylon of the carrier vehicle release the means fastening the bomb to its carrier. In the variant described, such means consist of rings, of which one, 8, is induced, as previously described and in accordance with a characteristic of the invention, to play a second role in addition to its suspension function: that of sensor of the proximity of the carrier. In the case of an inert drop, the releasable safety wires are released by the pylon under a weak force, insufficient to activate the mechanism described below. In the case of an active drop, the releasable base safety wire (SLC) is held by the pylon trigger and activates retractor 33, a practical variant of which is clearly schematized in FIG. 7. Said retractor consists essentially of a set of movable pulleys 34 and a set of compression springs 35. The base release safety wire SLC acts upon the set of movable pulleys 34, which compresses the set of compression springs 35 up to a limit set by a stop 36. Through this arrangement, said retractor can be reset. There follows the release of locking means 28. At the end of a certain travel, said locking means 28 releases bus bar 11, which moves backward under the effect of springs 37, in the direction indicated by arrow 38. If the drop is carried out "instantaneously," the pylon trigger holds the releasable nosecone safety wire SLO which activates a retractor 39 which is identical to retractor 33. An electric switch 40 assigns to an electric sequencer 41 the performance of the short sequence. However, the position of said switch 40 is final only if bus bar 11 has been placed in the "cocked" position, by virtue of mechanical means 110. If not, switch 40 returns to "long sequence" position. At the end of the travel of the retractors, the increase in the tension of the releasable safety wires causes the connections to break at calibrated breaking points 200 and 300 connecting the wires to the pylon trigger.

As shown in FIG. 7, safety releases SLO and SLC, as actually used, may be on either side of the suspension means.

According to an essential characteristic of the invention, if and only if bus bar 11 has moved back, it causes ring 8 to rotate by virtue of rotation means 42. Said ring 8 then plays the role of a sensor of the proximity of the bomb to its carrier. There here exists a combination between the shape of means 8 for fastening the bomb to its carrier, i.e., the shape of a ring, and the longitudinal movement of bus bar 11. If ring 8 is not free from the pylon lug, bus bar 11, even if released from locking means 28 and pulled by springs 37, cannot move back. The movement of bus bar 11 from its initial "safety" position to "cocked" position, prepares, as stated earlier and further specified below, the unlocking, in particular, of all of the fastening bolts. There are two mutually independent actions (opening of the lug and movement of the bar) required in order to enable the release operation and the functioning of the bomb to occur. This responds to the requirements of safety regulations in force in this area. This combination of means, particularly the arrangement of retractors cooperating with the bus bar, which itself is cooperating with the turning ring, has the further, considerable advantage of enabling a test of the safety mechanisms at any time. In fact, during storage or prior to use, it is possible to check for proper operation of the safeties. Though bus bar 11 is movable from the "safety" position to the "cocked" position, it can also be moved in the other direction. An action on ring 8 enables the return of bar 11 from the "cocked" position to the "safety" position.

When said bus bar 11 moves from the "safety" position shown in FIG. 7 to the "cocked" position, housings 43a, 43b, 43c in particular come opposite corresponding bolts 21a, 21b, 21c. According to another important characteristic of the invention, said bus bar 11, at the same time, releases a certain number of means, rendering them capable of obeying the commands which will be given them by the electronic sequencer, previously programmed as a function of the chosen drop conditions. First, in drawing back, the bus bar frees wind engine 6 and activates switch 44, which closes the electric circuit between the dynamo 45 driven by wind engine 6 and electronic sequencer 41. As soon as it is supplied, at time $T_0$, it operates. At time $(T_0+t_1)$ ($t_1$ being equal, for example, to 0.4 second), sequencer 41 delivers the command for firing a pyrotechnical pressure generator 46 affixed to back cover 19 of first module 4. This activates means 47 for the connection of parachute 30a of first module 4 and pushes the tail unit opening bolts (not shown). If, by accident, bus bar 11 has not moved back, generator 46 discharges into the atmosphere through valve 49, which is free, and element 47 for connection of parachute 30a is immobilized by bar 11.

In the case of a short sequence at time $(T_0+t_2)$ ($t_2$ being greater than $t_1$, i.e., 0.5 second, for example), sequencer 41 controls the firing of generator 60a of first module 4. Pyrotechnical generator 60a, affixed on back cover 19 of first module 4, activates both bolt 21a and means 61 for opening parachute extractor 29a of rear module 4. If at the moment of operation of pyrotechnical generator 60a bus bar 11 has not moved back, bolt 21a cannot be displaced by more than a short travel sufficient to prevent the later recoil of bar 11 but insufficient to unlock module 4 and command the opening of the parachute extractor. When bolt 21a is withdrawn, parachute extractor 29a opens (FIG. 6c) and draws out the sail of main parachute 30a, which, once open, extracts rear module 4 from shell 2 of bomb 1 (FIG. 6d). Rear module 4 draws out detector 23a, which in turn draws out the sail of parachute extractor 29b of intermediate module 14, as stated previously, by a tie 24a which separates from detector 23a when its tension reaches a specified value. When rear module 4 has been extracted from shell 2, it is sharply braked by its parachute 30a, and it follows a steeply curved trajectory such that its axis is close to vertical. After a period chosen as a function of the application, the delay device of fuse 230a functions. Module 4 explodes as soon as impact-detector 23a hits the ground. Meanwhile, at time $T_0+t_2+t$, bolt 21b of the next module 14 (the intermediate module), has been activated by pyrotechnical generator 60b, controlled by sequencer 41, and has simultaneously released module 14 and severed the halyard which prevented opening of main parachute 30b. Sequencer 41 gives this command within a specified time period t, which determines the ground distance which will separate one explosion from the next. Main parachute 30b of intermediate module 14 can then be deployed and extract said module 14 from the shell of the bomb (see FIG. 6e).

An analogous sequence and identical means assure the extraction of the front module.

FIG. 7 represents the greater detail and by way of example how a bolt 21, here bolt 21c corresponding to front module 13, positioned in housing 43c following backward displacement of bus bar, is simultaneously unlocked by the action of pyrotechnical generator 60c acting on unlocking means 70 and, by virtue of the special knife shape (c) of one of its ends, severs retaining halyard 210c holding the main parachute attached to said front module 13.

The drop operation is then terminated.

A modular bomb as described above combines the qualities of a fragmentable bomb capable of exploding into a considerable number of fragments, as many times as the bomb has modules. The safety added by virtue of the bus bar, in combination with the pivotable suspension ring, and the flexibility of operation, due particularly to the end to end arrangement of the modules inside the shell, said modules being extracted one by one by means of a parachute, make this bomb a reliable and effective weapon useful particularly for the neutralization on the ground of widespread or dispersed targets. The arrangement and use of the process described by way of example for a modular bomb containing a plurality of modules can, as stated above, be applied to charges of various types, such as sanitary equipment, food, etc., in addition to military charges.

What is claimed as new and desired to be secured by Letters Patent of the United States is:

1. Device for transporting and releasing a plurality of charges engaged on a vehicle by the engagement of a lug of said vehicle and suspension means of said charges, said charges contained in a single container comprising a shell, a nosecone-shaped forward point, and a back cover, said device comprising: a plurality of modules, assembled longitudinally in the shell from front to back, each of said modules including extraction means capable of extracting said modules one by one, upon command by control means, through the rear of the shell, said modules each consisting of a cylindrical body containing a charge; and control and release safety means preventing issuance of release and operation commands to the modules as long as said means suspending the container to said lug of said vehicle are not released.

2. Device of claim 1 wherein said extraction means consist, for each module, of a wide-sail parachute including means capable of keeping said parachute temporarily folded as long as said module is not ready to be extracted from the shell, and a parachute extractor for deploying said sail.

3. Device of claim 1 wherein the extraction means of the following module is connected to the front cover of the preceding module by means of a tie having a calibrated breaking point.

4. Device according to claims 1 or 2 wherein the back cover of the rear module constitutes the back cover of the container and carries a tail system comprising foldable tail fins and means ensuring their deployment by a command issued by the control means.

5. Device according to claim 2 wherein each said module is immobilized before release within the shell by means of fastening bolts temporarily and firmly connecting each module to said shell by means of a beam supporting forces acting on said modules.

6. Device of claim 5 wherein said fastening bolts are constructed such that upon retraction of said fastening bolts for extraction of the module from the shell, said fastening bolts neutralize the means keeping the parachutes folded.

7. Device according to claim 1 wherein said safety means are constructed to enable the displacement of a bus bar type general control element from an initial safety position in which the execution of commands at the level of all locked elements is prevented, to a second cocked position in which such execution is possible.

8. Device according to claim 7 wherein said control means are disposed in the forward point and comprise in particular an electric generator which receives its energy from a wind engine emerging from the forward point, the axle of said wind engine including means capable of blocking or unblocking its operation and controlled by said bus bar, said generator actuating an electronic sequencer designed and constructed to provide commands assuring the progression of the various release sequences.

9. Device of claim 7 wherein the construction of the means suspending the shell to the lug of said vehicle is such that it prevents displacement of the bus bar as long as said suspension means are not released from said lug.

10. Device of claim 9 wherein said suspension means comprises at least one pivoting ring which turns during displacement of the bus bar.

11. Device according to claim 10 wherein said ring is constructed such that, when not cooperating with the lug of said vehicle and after having pivoted under the effect of movement of the bus bar, said ring can, if made to pivot in the opposite direction, return said bus bar to its initial position, thus enabling checking of the proper functioning of the bus bar prior to use of the device.

12. Device of claim 7 wherein said safety means cooperate with a cable retractor in order to enable displacement of said bus bar, said retractor being capable of being reset.

13. Device of claim 12 wherein said cable retractor comprises a combination of compression springs.

14. The device according to claim 1 in combination with said container.

15. The device of claim 14 wherein each module contains a military charge contained within a body having weakened portions such that under the effect of the explosion of the charge said body fragments into a multitude of fragments, thus constituting a modular bomb.

16. Process for using a device for transporting and releasing a plurality of charges engaged on a vehicle and contained in a container, said process comprising:
opening of a lug of the vehicle, thus releasing suspension means of the container;
activation of release safety means including rotation of the suspension means and placement of a bus bar into a cocked position;
opening of a tail unit of said container and connection of a wide-sail parachute of the rear module to said rear module;
ejection of a parachute extractor of the rear module and opening of the wide-sail parachute;
retraction of a fastening bolt of the rear module;
extraction of the rear module, opening of a parachute extractor of the next intermediate module and breaking of a tie connecting said parachute extractor to a front cover of the rear module;
retraction of a fastening bolt of the intermediate module together with release of a wide-sail parachute of the intermediate module;
extraction of the intermediate module, opening of a parachute extractor of the next front module and breaking of a tie connecting said parachute to a front cover of the intermediate module;
retraction of a fastening bolt of the front module together with release of a wide-sail parachute; and
extraction of the front module.

* * * * *

UNITED STATES PATENT AND TRADEMARK OFFICE
CERTIFICATE OF CORRECTION

PATENT NO. : 4,372,215

DATED : February 8, 1983

INVENTOR(S) : Roger Crepin

It is certified that error appears in the above-identified patent and that said Letters Patent is hereby corrected as shown below:

On the title page, Item [30] should read:
[30] -- Foreign Application Priority Data May 23, 1979  [FR] France.....79 13201 --

Signed and Sealed this

Seventeenth Day of May 1983

[SEAL]

Attest:

DONALD J. QUIGG

Attesting Officer    Acting Commissioner of Patents and Trademarks